Jan. 10, 1939.　　　　S. OLSON　　　　2,143,165
DISHWASHER
Filed March 30, 1936　　2 Sheets-Sheet 1
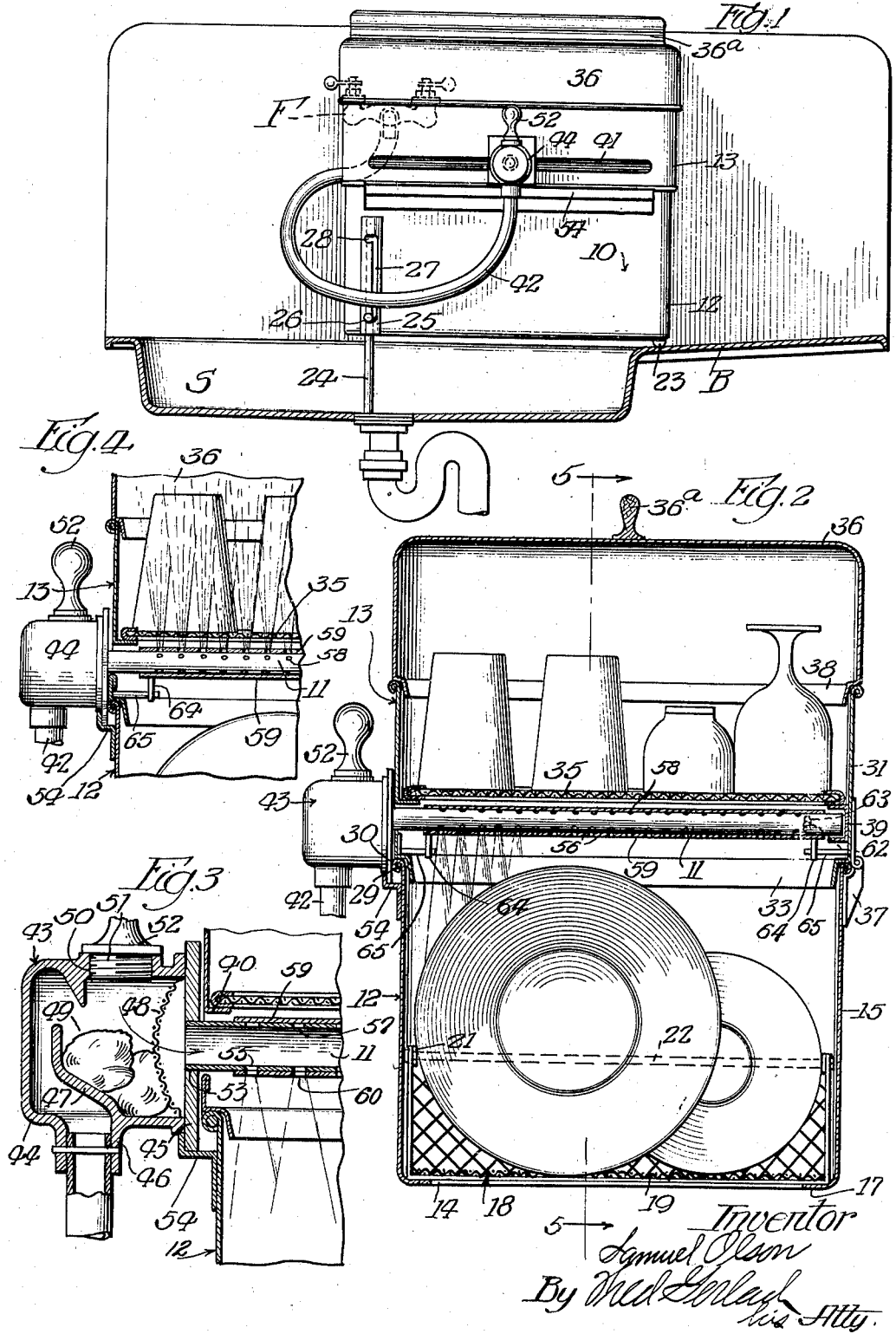
Inventor
Samuel Olson
By Fred Gerlach
his Atty.

Jan. 10, 1939.  S. OLSON  2,143,165
DISHWASHER
Filed March 30, 1936  2 Sheets-Sheet 2
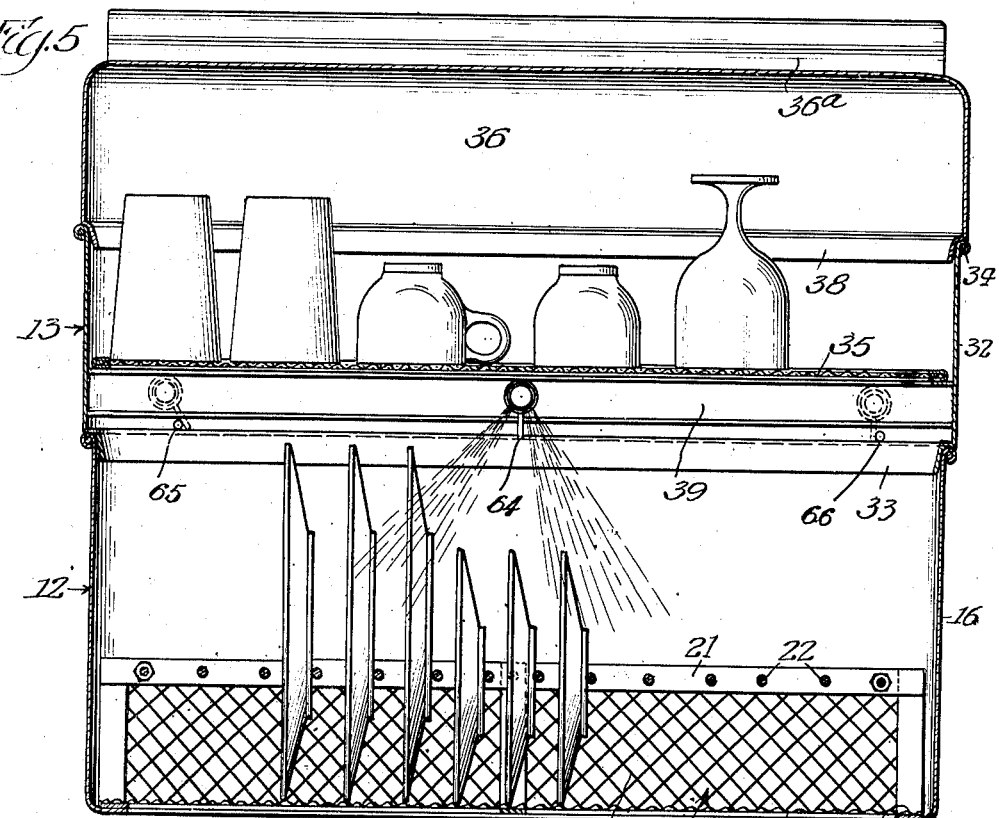
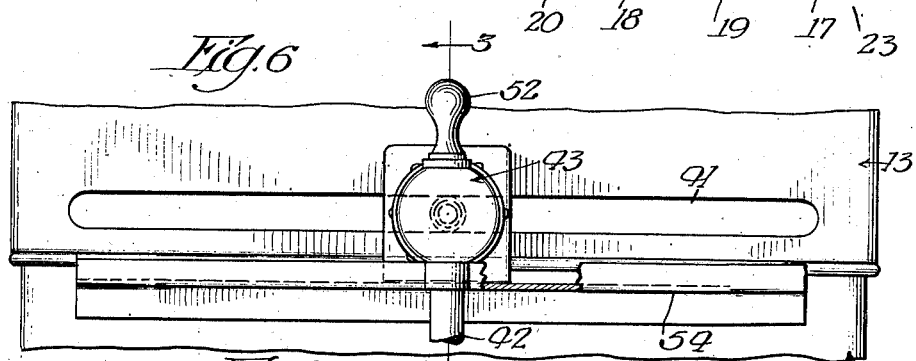
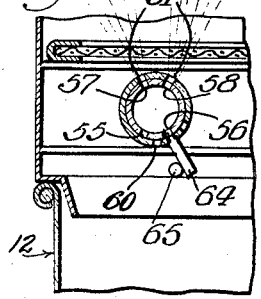 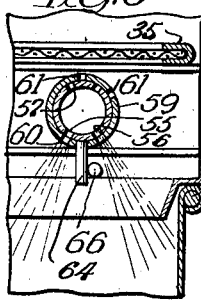 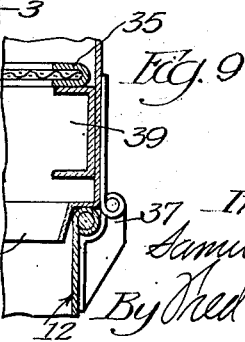
Inventor
Samuel Olson
By Fred Gerlach
his Atty.

Patented Jan. 10, 1939

2,143,165

UNITED STATES PATENT OFFICE 2,143,165

DISHWASHER

Samuel Olson, Oak Park, Ill.

Application March 30, 1936, Serial No. 71,574

7 Claims. (Cl. 141—9)

The present invention relates generally to dish washers. More particularly the invention relates to that type of dish washer which effects washing of the dishes by way of water under pressure from a faucet over a sink and comprises as the main parts thereof: (1) an elongated, box-like receptacle which is adapted to be positioned over the sink and with one end thereof resting on the drainboard for the sink, has extensible legs at its other end for supporting it in a substantially horizontal position and in spaced relation with respect to the bottom of the sink, and consists of a bottom section with a bottom opening for the drainage of water from the receptacle and a top section for closing the bottom section; (2) a basket-type rack which is removably mounted in the lower portion of the bottom section of the receptacle and serves to hold the dishes so that they are disposed one in front of the other and extend vertically in, as well as transversely of, the receptacle; and (3) a horizontal spray-pipe which extends transversely across the upper portion of the receptacle and is movable bodily in a horizontal plane from one end of the receptacle to the other, receives water from the faucet by way of a flexible hose and is provided with one or more longitudinal series of downwardly facing jet openings for discharging streams of water downwardly onto the dishes in the rack for dishwashing purposes during back and forth movement of the pipe.

One object of the invention is to provide a dish washer of this type which is generally an improvement upon, and has greater capabilities of use than, previously designed dish washers of the same general character by reason of the fact that the top section of the receptacle has a rack in the lower portion thereof for supporting glasses and cups in an inverted position over the pipe, and the pipe includes one or more longitudinal series of upwardly facing, jet openings for discharging streams of water upwardly against the glasses and cups on the rack for washing purposes during supply of water to the pipe from the faucet and movement of the pipe back and forth with respect to the receptacle.

Another object of the invention is to provide a dish washer of the type and character last mentioned in which the spray pipe is provided with simple means whereby either the upwardly facing jet openings or the downwardly facing jet openings may be closed in order to eliminate waste of water when the receptacle has only glasses or cups on the rack in the top section thereof, or dishes in the rack in the bottom section.

Another object of the invention is to provide a dish washer of the character last referred to in which the means for closing either the upwardly facing jet openings in the pipe or the downwardly facing jet openings, consists of a sleeve which extends around and is rotatable relatively to the pipe, is adapted when rotated in one direction to close the upwardly facing jet openings and when rotated in the other direction relatively to the pipe to close the downwardly facing openings, and is provided with means whereby it is rotated in one direction when the pipe is moved to one end of the receptacle and is rotated in the other direction for jet opening and closing purposes when the pipe is shifted or moved to the other end of the receptacle.

Another object of the invention is to provide a dish washer of the type and character under consideration in which the top section of the receptacle embodies a horizontally extending, U-shaped strip on the inner face of one of the sides thereof, and one end of the spray-pipe is positioned and slidably mounted in the U-shaped strip and the other end extends through a longitudinal, horizontally extending slot in the other side of the top section of the receptacle.

A further object of the invention is to provide a dish washer of the last mentioned character in which the glass and cup supporting rack rests on the U-shaped strip on one side of the top section of the receptacle and also on an inwardly extending flange above the pipe receiving slot in the other side of the top section, and said top section of the receptacle has an open top whereby access may be had thereto for placing glasses and cups on the rack and removing them therefrom, and also has a lid or cover for closing its open top.

A still further object of the invention is to provide a dish washer of the type and character under consideration which is extremely efficient in operation and is an improvement upon that exhibited in Letters Patent of the United States No. 2,038,803, granted to me April 28, 1936.

Other objects of the invention and the various advantages and characteristics of the present dish washer will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front elevation showing a dish washer embodying the invention in an operative position over a sink;

Figure 2 is a vertical transverse section of the dish washer disclosing in detail the arrangement of the racks with respect to the spray pipe but omitting the extensible legs and the leg brackets on the receptacle;

Figure 3 is a detail sectional view of that end of the spray pipe which projects through the slot in the top section of the receptacle;

Figure 4 is a detail sectional view showing the manner in which the upwardly discharged streams of water from the spray pipe serve to wash articles such as glasses and cups on the rack in the top section of the receptacle;

Figure 5 is a vertical longitudinal section of the dish washer taken on the line 5—5 of Figure 2;

Figure 6 is a fragmentary side view illustrating the manner in which the spray pipe is supported so that it is shiftable longitudinally of the receptacle from one end of the latter to the other;

Figure 7 is a detail sectional view showing the manner in which the sleeve on the spray pipe is rotated to close the downwardly facing jet openings when the pipe is shifted to one end of the receptacle;

Figure 8 is a detail sectional view showing the manner in which the sleeve is rotated in the reverse direction to close the upwardly facing jet openings in the pipe when the pipe is shifted or moved to the other end of the receptacle; and Figure 9 is a detail sectional view of the hinge connection between the top and bottom sections of the receptacle whereby the top section may be swung upwardly and to one side of the bottom section in order to permit of access to the interior of the bottom section for dish insertion or removal purposes.

The dish washer which forms the subject matter of the invention comprises an elongated box-like receptacle 10 and a spray pipe 11 and is adapted to be used in connection with a sink S having a drainboard B and a two valve faucet F for supplying either hot or cold water into it.

The receptacle is formed of sheet metal and consists of a bottom section 12 and a top section 13. The bottom section has an opening 14 in the bottom thereof for the drainage of water from the receptacle and consists of a pair of sides 15 and ends 16. The sides and ends are preferably formed from a single strip of sheet metal so that the bottom section is of one piece construction. The lower margins of the sides and ends 14 and 15 are bent inwardly to form a continuous inwardly extending flange 17 around the opening 14 in the bottom of the bottom section. This flange serves to reinforce the bottom section of the receptacle and also to support a basket-type rack 18. This rack operates to support dishes in an upstanding or vertical position in the bottom section of the receptacle and consists of a bottom 19 and a pair of sides 20. The bottom and sides are formed of screen or wire mesh material so that water from the spray pipe 11 is free to drain from the receptacle through the opening 14 in the bottom of the bottom section 12. The sides 20 of the rack are spaced slightly inwardly of the sides 15 of the bottom section of the receptacle and have metal reinforcing strips 21 at the upper margins thereof. These strips support a series of rods 22 for holding the dishes so that they are disposed one in front of the other and transversely of the receptacle. As shown in Figure 5 of the drawings the rods 22 are disposed in a horizontal plane and are spaced apart laterally and equidistantly. The ends of the rods extend through the reinforcing strips 21 along the upper margins of the rack sides 20 and embody suitable means (not shown) whereby they are held against axial displacement with respect to the rack. The rack is removable from the bottom section 12 through the top of the latter so that it may be cleaned independently of the receptacle and the washed dishes may be removed as a group from the bottom section 12. The dishes, as shown in Figure 5, are adapted to fit between the rods 22 and are held by the rods in substantially vertical position and with sufficient space therebetween so that water directed from the spray-pipe will encounter all portions thereof. The receptacle is adapted to be positioned over the sink S and embodies a pair of knob-like feet 23 at one end and a pair of extensible legs 24 at its other end. The feet 23 are formed of rubber or any other suitable material and are adapted to rest on the drainboard B, as shown in Figure 1. They are secured in any suitable manner to the inwardly extending flange 17 at the bottom of the bottom section 12 and are located at two of the corners of the receptacle. The legs 24 are vertically slidable in brackets 25 on the sides 15 of the bottom section of the receptacle and have their upper ends bent outwardly at right angles so as to form locking members 26. The latter are vertically slidable in longitudinal slots 27 in the brackets and are adapted to be shifted or manipulated into notches 28 leading laterally from the slots in order to hold the legs 24 in different positions with respect to the brackets. The legs are adapted to rest on the bottom of the sink and to hold the receptacle in a horizontal position. By utilizing extensible legs 24 the receptacle may be used with a shallow sink, as shown in Figure 1 of the drawings, or a comparatively deep sink. In order to adjust the legs 24 so that the latter are properly positioned to support the receptacle horizontally the locking members 26 are slid vertically in the slots 27 to the proper notches 28 and then are swung sidewise into such notches so as to lock the legs in place and against axial displacement with respect to the brackets 25. The upper margins of the sides and ends of the bottom section of the receptacle are bent outwardly around a wire 29 to form a reinforced edge 30 at the top of the bottom section of the receptacle. The top section 13 of the receptacle overlies and serves as a closure for the bottom section 12 and consists of a pair of sides 31 and ends 32. The latter are preferably formed from a single strip of sheet metal so that the top section is of one piece construction or design. The bottom margins of the sides and ends of the top section are bent inwardly and downwardly to form a continuous flange 33. The latter, as shown in the drawings, is adapted to rest on and fit within the reinforced edge 30 at the top of the bottom section 12 of the receptacle. The upper margins of the sides and ends of the top section 13 are bent outwardly around a wire to form a reinforced edge 34. The top section 13 of the receptacle has a rack 35 for supporting glasses and cups in an inverted position over the spray-pipe 11. It also has a cover 36 and is connected to the bottom section 12 by a hinge 37. The latter is located at one side of the receptacle and permits the top section to be swung upwardly and laterally with respect to the bottom section in order to provide access to the interior of the bottom section of the receptacle. The cover 36, like the sides and ends of the top section of the receptacle, is formed of sheet metal. It is provided with a handle 36ᵃ across the top thereof and embodies at its lower or bottom margin an inwardly and downwardly extending continuous flange 38. This flange is adapted to rest on and extend within the reinforced edge 34 of the sides and ends of the top section of the receptacle in order to hold the cover in connected relation with respect to the top section. The handle 36ᵃ extends longitudinally across the top of the cover and permits the cover to be readily gripped whenever it is desired to remove it from or place it on the top section of the receptacle. The rack 35 is formed of the same material as the basket-type rack 18 in the lower portion of the bottom section 12 of the receptacle. It is disposed in the lower portion of the top section of the receptacle directly above the spray-pipe 11 and is supported at one side thereof on the uppermost leg of an inwardly facing, longitudinally extending, U-shaped strip 39. The latter, as shown in the drawings, is connected to the inner face of the side 31 of the top section of the receptacle to which the hinge 37 is applied. The other side of the rack 35 rests on and is supported by a flange 40 which extends lengthwise of and inwardly from the other side 31 of the top section of the receptacle and overlies a longitudinal slot 41. The rack is removable through the top of the top section of the receptacle for cleaning purposes and the cover 36 is of such height that there is sufficient room above the rack for the rack to support glasses and cups of different heights. The slot 41 extends substantially from one end of the top section of the receptacle to the other and the flange 40 is formed by bending inwardly the metal which is cut out from the top section 13 to form the slot 41. The slot 41, as shown in Figure 2 of the drawings, is disposed directly opposite and in the same horizontal plane as the U-shaped strip 39. The latter is welded or soldered to the inner face of the hinged side 31 of the top section of the receptacle and with the flange 40 serves to reinforce the top section of the receptacle as well as to support or form a rest for the rack 35.

The spray-pipe 11 extends transversely across the lower portion of the top section 13 of the receptacle and is shiftable or movable back and forth in a horizontal plane from one end of the receptacle to the other. One end of the pipe, as shown in Figure 2, fits and is slidably mounted in the U-shaped strip 39 on the side 31 which is hinged to the bottom section of the receptacle. The other end of the spray pipe extends through and is guided for rectilinear movement in the slot 41 in the opposite side 31 of the top section of the receptacle. Water from the faucet F over the sink S is supplied to the spray-pipe 11 by means of a flexible hose 42. This hose is adapted to be clamped or otherwise secured to the faucet and is connected by a casing 43 to the end of the spray-pipe which projects or extends through the slot 41. The casing 43 consists of a cast metal, open sided body 44 and a square plate 45. The body, as shown in Figure 3, has a depending boss 46 to which the discharge end of the hose 43 is attached. In addition to the boss 46 the body of the casing has a web 47 and a screen 48. The screen is located adjacent the plate 45 and forms with the web a compartment 49 for soap. Access to this compartment is had by way of a hole 50 in the top of the body of the casing. A screw plug 51 with a handle 52 serves as a removable closure for the hole 50. The plate 45 is secured to and forms a closure for the open end of the casing and has a central aperture 53 in which the contiguous end of the spray-pipe fits and is secured. The screen 48 serves to hold the soap in the compartment from passing into the spray pipe. When the hose 42 is connected to the faucet and the faucet is opened, water flows through the hose and into the body 44 of the casing. Upon entry into the casing body the water flows around the web 47 and then through the compartment 49 and into the spray-pipe 11. As the water flows through the compartment it contacts with the soap. The bottom margin of the square plate 45 fits on a longitudinally extending sheet metal track 54 on the bottom section 12 of the receptacle. This track is welded or otherwise secured to the side 15 of the bottom section that is adjacent to the casing 43. As shown in the drawings, the track 54 is substantially coextensive with the slot 41 in the top section of the receptacle and supports the spray-pipe so that it is vertically centered with respect to the slot and is movable bodily from one end of the slot to the other. The spray-pipe has a longitudinal series of downwardly facing jet openings 55 and a longitudinal series of downwardly facing jet openings 56. The openings 55 are inclined at approximately an angle of 22½° toward one end of the receptacle and operate during back and forth movement of the spray-pipe to direct streams of water downwardly and outwardly against the bottom or under faces of the dishes on the rack 18. The jet openings 56 are inclined towards the other end of the receptacle at approximately an angle of 22½°, and serve during back and forth movement of the spray-pipe to jet streams of water downwardly and outwardly against the top faces of the plates. Because of the angular arrangement of the openings 55 and 56 both faces of the dishes are subjected to streams of water during horizontal movement of the spray-pipe. When the spray-pipe is moved in one direction the streams of water from the jet openings 55 travel downwardly across the back faces of the dishes and the streams of water from the jet openings 56 travel upwardly across the front faces of the dishes as the dishes successively come in range of the streams. When the spray-pipe is shifted in the other direction the streams of water from the jet openings 55 travel upwardly across the back faces of the dishes and the streams of water from the jet openings 56 travel downwardly across the front or top faces of the dishes. By having the streams of water sweep upwardly and downwardly across the faces of the dishes an efficient washing is effected. As shown in Figure 2 of the drawings, the jet openings 55 and 56 extend substantially from one end of the spray-pipe to the other.

In order to effect washing of the glasses and cups on the rack 35 the spray pipe 11 has a longitudinal series of upwardly and outwardly facing jet openings 57 and a longitudinal series of upwardly and outwardly facing jet openings 58. The openings 57 extend at approximately an angle of 22½° toward one end of the receptacle and operate during back and forth movement of the spray-pipe to direct or discharge streams of water upwardly against the glasses and cups on the rack 35. The jet openings 58 are inclined outwardly toward the other end of the receptacle at approximately an angle of 22½° and serve to jet streams of water upwardly toward the glasses and cups. By reason of the fact that the openings 57 and 58 are inclined outwardly in opposite directions the glasses and cups are subjected to streams of water directed from different directions and hence maximum efficiency is effected as far as washing is concerned. For the purpose of permitting the user of the dish washer to close either the jet openings 55 and 56 or the jet openings 57 and 58 a sleeve 59 is provided. This sleeve extends around and is rotatable relatively to the spray-pipe, and has a set of openings 60 in the bottom portion thereof and a set of openings 61 in the top portion thereof. The set of openings 60 correspond in number to the jet openings 55 and 56 and are adapted when the sleeve is rotated in one direction to register with said jet openings so as to uncover the latter and permit of downward and outward flow of streams of water from the spray-pipe. When the sleeve is rotated in the other direction the openings 60 are rotated out of registry with the jet openings 55 and 56 and the latter are closed and thus kept from discharging streams of water downwardly onto the dishes on the rack 18. The openings 61 correspond in number to the jet openings 57 and 58 and are adapted to register with said jet openings when the sleeve is rotated so as to shift the openings 50 out of registry with the jet openings 55 and 56. When the openings 61 are in registry with the jet openings 57 and 58, streams of water will be discharged upwardly and outwardly through the rack 35 onto the glasses and cups thereabove. Rotation of the sleeve relatively to the pipe is limited by means of a pin 62 which is mounted on one end of the spray-pipe and fits in a slot 63 in the sleeve. When the sleeve is rotated so that the pin strikes against one end of the slot the openings 60 are adapted to register with the jet openings 55 and 56. When the sleeve is rotated in the opposite direction so that the pin strikes the other end of the slot the openings 61 are adapted to register with the jet openings 57 and 58. In order automatically to rotate the sleeve 59 in one direction when the spray-pipe reaches one end of the receptacle and to rotate it in the opposite direction when the spray-pipe reaches the other end of the receptacle a pair of pins 64 is provided. These pins extend radially from the ends of the sleeve and are adapted to strike against a pair of lugs 65 at one end of the receptacle and a pair of lugs 66 at the other end of the receptacle. The lugs 65 are secured in any suitable manner to the sides 31 of the top section of the receptacle, and as shown in Figure 7 of the drawings, operate through the medium of the pins 64 to rotate the sleeve 59 to close the jet openings 55 and 56 and to open the jet openings 57 and 58 when the spray-pipe is shifted to the end of the receptacle having the lugs 65. As shown in Figure 8, the lugs 66 operate when the spray-pipe is shifted to the other end of the receptacle to rotate the sleeve so as to open the jet openings 55 and 56 and close the jet openings 57 and 58. When the spray-pipe is shifted back and forth in the receptacle the sleeve is automatically rotated in one direction and then the other so as alternately to open the jet openings 56 and 57 and the jet openings 58 and 59. If it is desired to wash glasses or cups on the rack 35 without directing streams of water downwardly toward the rack 18, the spray-pipe is shifted toward the lugs 65 so as to rotate the sleeve to open the jet openings 57 and 58. Thereafter the spray-pipe is shifted back and forth without bringing the pins 64 into engagement with the lugs 66. When it is desired to cut off the upwardly and outwardly directed streams of water from the jet openings 57 and 58 so as to spray downwardly only the spray-pipe is shifted so as to cause the pins 64 to strike against the lugs 66. This rotates the sleeve so as to cut off the jet openings 57 and 58 and to open the jet openings 55 and 56. With the sleeve so positioned the spray-pipe may be shifted back and forth the desired number of times without causing the pins 64 to strike against the lugs 65. When it is desired to alternately spray glasses and cups on the rack 35 and dishes on the rack 18 the spray-pipe is shifted back and forth with full strokes so that the lugs 65 and 66 operate in turn to rotate the sleeve first in one direction and then in the other.

In using the dish washer to wash dishes, glasses and cups, the receptacle 10 is first placed in a horizontal position over the sink S and with the feet 23 on the drainboard D of the sink. After so placing or positioning the receptacle the flexible hose 42 is connected to the faucet. Thereafter the top section 13 of the receptacle is swung upwardly into its open position so as to provide access to the interior of the bottom section of the receptacle. After opening of the bottom section the dishes are placed on the rack 18 so that they fit between the rods 22 and are positioned one in front of the other and transversely of the receptacle. After placing of the dishes in the rack 18 the top section 13 is swung back into its normal or closed position on top of the bottom section of the receptacle and the cover 36 is removed so as to provide access to the interior of the top section 13. After removal of the cover, the glasses and cups are placed in an inverted position on the rack 35 and the cover 36 is returned to its normal position on top of the top section of the receptacle and the hot water side of the faucet F is turned on so as to effect flow of hot water through the hose 42 to the spray-pipe 11. During supply of water to the spray-pipe, the spray-pipe is shifted back and forth in the slot 41 with the result that streams of water are directed first upwardly and then downwardly. When the spray-pipe is shifted in one direction, as previously pointed out, the jet openings 55 operate to direct or jet downwardly streams of water onto the dishes on the rack 18. During shift or movement of the spray-pipe in the other direction the sleeve 59 closes the jet openings 55 and 56 and opens the openings 57 and 58 so that jets or streams of water are directed upwardly through the rack 35 against the cups and glasses on the rack. If it is desired to wash the glasses and cups before the dishes, the spray-pipe is shifted back and forth slightly short of a full stroke so that the pins 64 are not brought into engagement with the lugs 66. When it is desired to wash the dishes the spray-pipe is shifted so as to cause the pins 64 to engage the lugs 66 and thus rotate the sleeve 59 so that it closes the jet openings 57 and 58 and opens the openings 55 and 56. At the conclusion of the washing operation the cover 36 is removed from the top section of the receptacle and after pouring clean water over the glasses and dishes in order to rinse the soap therefrom the glasses and cups are removed from the rack 35. Thereafter the cover is replaced and the top section 13 of the receptacle is swung upwardly to provide access to the interior of the bottom section 12 of the receptacle for dish removal purposes. The U-shaped strip 39 has a two-fold function or purpose in that it operates to support the rack 35 and guides and supports one end of the spray-pipe 11.

The herein described dish washer is not only extremely efficient in operation but may be produced at a low and reasonable cost in view of its simplicity and small number of parts.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a dish washer of the character described, the combination of an elongated receptacle adapted to be placed over a sink and comprising a bottom section with a water discharge opening therein and a top section hinged to the bottom section so that it may be swung to one side of said bottom section from a normal position over the latter, a rack in the bottom section of the receptacle for holding articles of tableware, a removable rack in the lower portion of the top section of the receptacle for holding other articles of tableware, a horizontal spray pipe disposed in the receptacle between the two racks and having one end thereof projecting through a horizontal slot in one of the side walls of one of the sections and its other end terminating adjacent the other side wall of said one section, and also having a longitudinal series of downwardly facing jet openings for discharging streams of water downwardly onto the articles on the first mentioned rack and a longitudinal series of upwardly facing jet openings for discharging streams of water upwardly through the second mentioned rack onto the other articles, a mounting for the pipe whereby the latter is supported so that it may be moved laterally in a horizontal plane from one end of the receptacle to the other, and a flexible connection attached to said one end of the spray pipe for supplying water under pressure to the spray pipe.

2. In a dish washer of the character described, the combination of a receptacle adapted to be placed over a sink and comprising a bottom section with a water discharge opening therein and a removable top section positioned over the bottom section and provided with a cover, a rack in the bottom section of the receptacle for holding articles of tableware, a rack in the lower portion of the top section of the receptacle for holding articles of tableware placed in said top section when the cover is removed, a horizontal spray-pipe disposed in the receptacle between the two racks and having one end thereof extending through a horizontal slot in one of the side walls of one of the sections and its other end terminating adjacent to the other side wall of said one section, and also having a longitudinal series of downwardly facing jet openings for discharging streams of water downwardly onto the articles on the first mentioned rack and a longitudinal series of upwardly facing jet openings for discharging streams of water upwardly through the second mentioned rack onto the other articles, a mounting for the pipe whereby the latter is supported so that it may be moved laterally in a horizontal plane from one end of the receptacle to the other, and a flexible connection attached to said one end of the spray pipe for supplying water under pressure to the pipe.

3. In a dish washer of the character described, the combination of an elongated receptacle adapted to be placed over a sink, and comprising a bottom section with a water discharge opening therein and a cover equipped top section having a horizontal slot across the lower portion of one of its sides and hinged to one side of the bottom section so that it may be swung or removed to one side of said bottom section from a normal position over the latter, a rack in the bottom section of the receptacle for holding articles of tableware, a rack positioned in the top section of the receptacle and above the slot and adapted to hold other articles of tableware placed in said top section when the cover is removed, a horizontal spray pipe with one end thereof projecting outwardly through the slot and its other end terminating adjacent to the other side of the top section of the receptacle; carried by said top section so that it may be reciprocated in a horizontal plane from one end of the receptacle to the other and having a longitudinal series of downwardly facing jet openings for discharging streams of water downwardly onto the articles on the first mentioned rack and having a longitudinal series of upwardly facing jet openings for discharging streams of water upwardly through the second mentioned rack onto the other articles, and a flexible connection attached to said one end of the pipe for supplying water under pressure to the spray-pipe.

4. In a dish washer of the character described, the combination of an elongated receptacle adapted to be placed over a sink and having a horizontally extending inwardly facing U-shaped strip on the inner face of the upper portion of one of the sides thereof and a horizontal slot in its other side and directly opposite and vertically aligned with the inwardly facing U-shaped strip, means in the lower portion of the receptacle for holding articles of tableware, a horizontal spray-pipe having one end thereof fitting slidably in the inwardly facing U-shaped strip and its other end extending through the slot so that it is shiftable laterally in a horizontal plane from one end of the receptacle to the other, and provided with a longitudinal series of downwardly facing jet openings for discharging streams of water downwardly onto the articles on the holding means, a flexible connection attached to said other end of the pipe for supplying water under pressure to the pipe, and means at the bottom of the receptacle forming a water outlet.

5. In a dish washer of the character described, the combination of an elongated receptacle adapted to be placed over a sink and comprising a bottom section with a water discharge opening therein, and a removable cover equipped top section disposed over the bottom section and provided at one side thereof with a horizontally extending slot and with inwardly extending means over the slot, an inwardly facing U-shaped strip extending horizontally and secured to the inner face of the other side of the top section of the receptacle, a rack in the bottom section of the receptacle for holding articles of tableware, a rack in the upper section of the receptacle resting on the strip and said inwardly extending means and adapted to hold other articles of tableware, a spray-pipe having one end thereof fitting slidably in the strip and its other end extending through the slot so that it is shiftable laterally in a horizontal plane from one end of the receptacle to the other, and having a longitudinal series of downwardly facing jet openings for discharging streams of water downwardly onto the articles on the first mentioned rack and having a longitudinal series of upwardly facing jet openings for discharging streams of water upwardly through the second mentioned rack onto the other articles of tableware, and a connection for supplying water under pressure to said other end of the spray pipe.

6. A dish washer comprising in combination an elongated receptacle having a water discharge opening in the bottom thereof and provided with means in the lower portion thereof for holding articles of tableware and also provided with means in the upper portion thereof for holding other articles of tableware, a spray-pipe mounted on the receptable between the two article holding means and so that it is shiftable sidewise in a substantially horizontal plane back and forth between the ends of the receptacle, and having a longitudinal series of downwardly facing jet openings for discharging streams of water downwardly onto the articles held by the first mentioned means, and having a longitudinal series of upwardly facing jet openings for discharging streams of water upwardly against the articles held by the second mentioned means, a connection for supplying water under pressure to the spray-pipe, a rotatable sleeve on the pipe for closing the jet openings of either series, and means operative automatically in response to sidewise shift of the spray pipe to either end of the receptacle for rotating the sleeve for adjustment purposes.

7. A dish washer comprising in combination a receptacle having a water discharge opening in the bottom thereof and provided with means in the lower portion thereof for holding articles of tableware and also provided with means in the upper portion thereof for holding other articles of tableware, a spray-pipe mounted on the receptacle so that it is shiftable sidewise in a substantially horizontal plane between the two article holding means, and having a longitudinal series of downwardly facing jet openings for discharging streams of water downwardy onto the articles held by the first mentioned means, and having a longitudinal series of upwardly facing jet openings for discharging streams of water upwardly against the articles held by the second mentioned means, a connection for supplying water under pressure to the spray-pipe, a rotatable sleeve on the pipe adapted when rotated in one direction to close one series of openings and open the other and when rotated in the other direction to open said other series of openings and to close said other, means for automatically rotating the sleeve in one direction when the pipe is shifted sidewise in one direction, and means for automaticaly rotating the sleeve in the other direction when the pipe is shifted sidewise in the opposite direction.

SAMUEL OLSON.